United States Patent
Langezaal

(10) Patent No.: US 7,712,252 B2
(45) Date of Patent: May 11, 2010

(54) METHOD OF MANUFACTURING A GROWTH SUBSTRATE

(75) Inventor: Lucas Everhardus Maria Langezaal, Kampen (NL)

(73) Assignee: Van der Sluis Cigar Machinery B.V. (NL)

( * ) Notice: Subject to any disclaimer, the term of this patent is extended or adjusted under 35 U.S.C. 154(b) by 493 days.

(21) Appl. No.: 10/545,192

(22) PCT Filed: Feb. 10, 2004

(86) PCT No.: PCT/NL2004/000091

§ 371 (c)(1), (2), (4) Date: May 18, 2006

(87) PCT Pub. No.: WO2004/071176

PCT Pub. Date: Aug. 26, 2004

(65) Prior Publication Data

US 2006/0248795 A1    Nov. 9, 2006

(30) Foreign Application Priority Data

Feb. 14, 2003   (NL) .................................. 1022683
May 7, 2003    (NL) .................................. 1023354

(51) Int. Cl.
*A01G 31/00* (2006.01)
*A01C 1/04* (2006.01)

(52) U.S. Cl. .......................................... 47/59 S; 47/56

(58) Field of Classification Search ................. 47/59 S, 47/58.1 R, 1.01 F, 64, 56, 57.6, 41.01
See application file for complete search history.

(56) References Cited

U.S. PATENT DOCUMENTS

| | | | | |
|---|---|---|---|---|
| 4,972,627 A | * | 11/1990 | Hori et al. | ........................ 47/64 |
| 6,615,537 B2 | * | 9/2003 | Tonkin et al. | ............ 47/58.1 R |
| 2004/0020114 A1 | * | 2/2004 | Boehmer et al. | ............. 47/57.6 |
| 2005/0028441 A1 | * | 2/2005 | Abitz et al. | ..................... 47/56 |

FOREIGN PATENT DOCUMENTS

| | | |
|---|---|---|
| DE | 37 06 235 A1 | 9/1988 |
| EP | 0 249 261 A1 | 12/1987 |
| EP | 0 522 437 A2 | 1/1993 |
| WO | WO 94/22287 A | 10/1994 |
| WO | WO 00/60922 A | 10/2000 |

* cited by examiner

*Primary Examiner*—Michael R Mansen
*Assistant Examiner*—Monica L Williams
(74) *Attorney, Agent, or Firm*—Akerman Senterfitt

(57) ABSTRACT

The invention relates to a method of manufacturing a culture medium on which plants can be grown. This method is characterized by a) mixing I: a particulate base material, chosen from at least one of organic and inorganic materials, with II: a thermoplastic biologically degradable binding agent, b) heating at least the binding agent in order to at least partly fluidize it, c) cooling the mixture so as to substantially solidify the binding agent and whereby at least a part of the base material becomes bonded by means of the binding agent. The method according to the invention provides an environmentally safe and plant-friendly culture medium that is biologically degradable and retains its shape well.

18 Claims, 2 Drawing Sheets

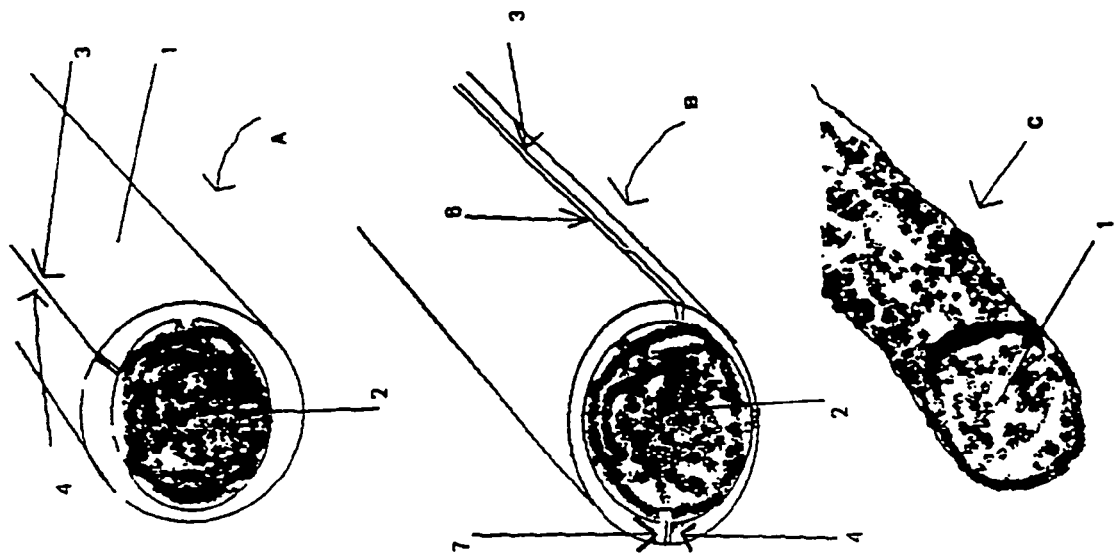
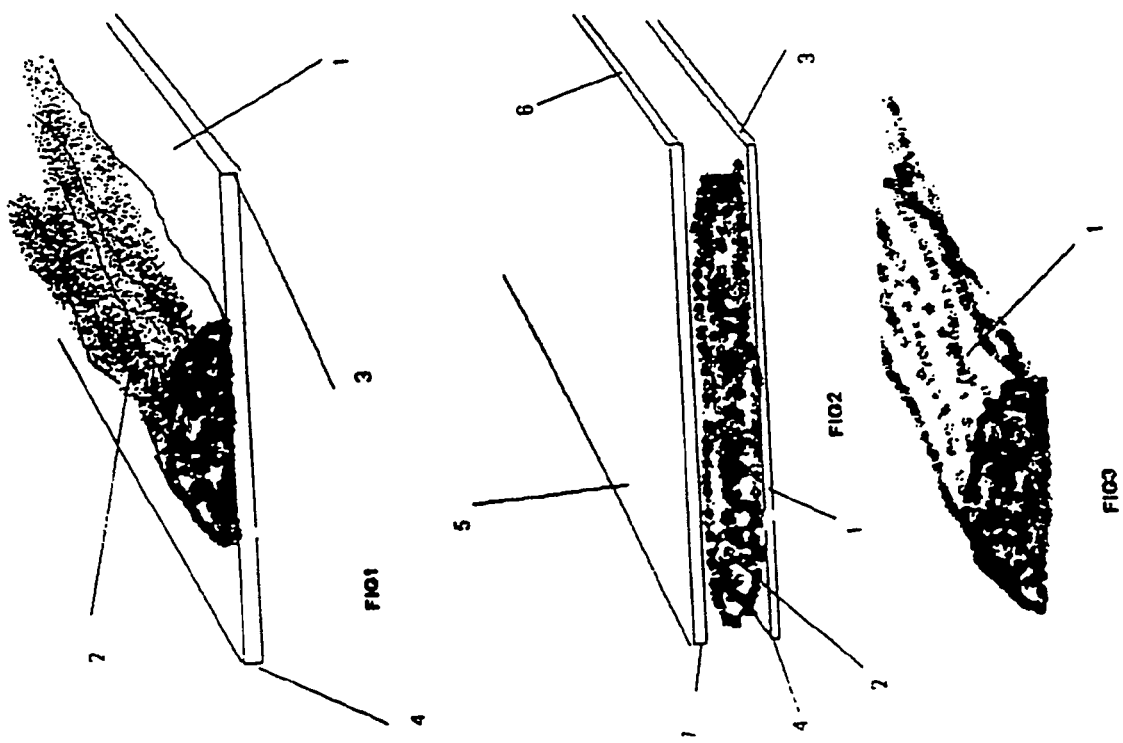

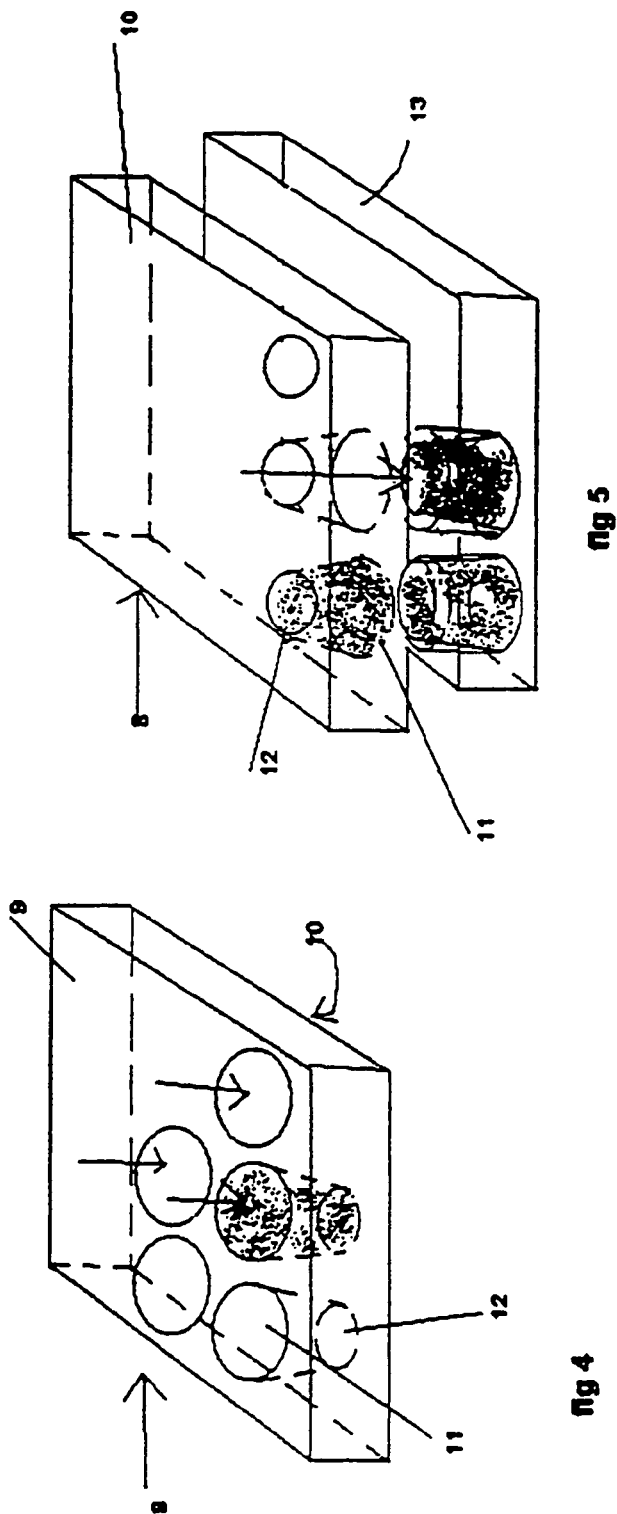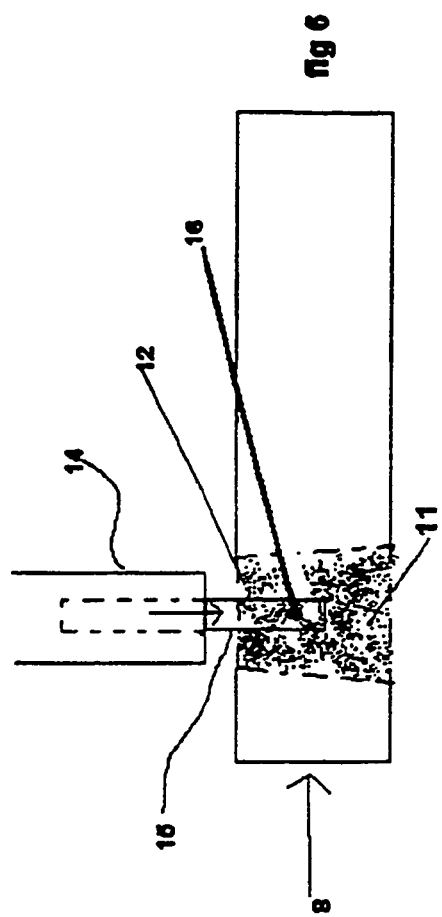

METHOD OF MANUFACTURING A GROWTH SUBSTRATE

The present invention relates to a method of manufacturing a culture medium on which plants can be grown.

The use of culture mediums is generally known in practice, for example, in market gardening. In particular in greenhouse cultivation, culture mediums are generally used for germinating seeds and growing plants. A known method of preparing a culture medium is described in the Dutch patent application NL-1,017,460. This application discloses that an organic base material is mixed with a polymerisable mixture, after which the polymerisable mixture is polymerised. However, this method requires the addition of a foaming agent if it is desired that the polymer matrix have an open structure. This will generally be the case as it improves its water absorption. However, the composition of the culture medium obtained by this method is very hard, and this cannot be improved by adjusting the amount of polymer.

The object of the invention is therefore to provide a method by which a culture medium can be manufactured that has a bonded but open structure.

It is a particular object of the invention to provide a culture medium having a consistency that is substantially the same as the consistency of the base material.

The object of the invention is finally to provide a method by which an environmentally safe culture medium can be obtained.

In order to achieve at least one of the afore-mentioned objectives, the invention provides a method as stated in the preamble, which is characterised, in that it comprises the steps of:
   a) mixing I: a particulate base material, chosen from at least one of organic and inorganic materials, with II: a thermoplastic biologically degradable binding agent,
   b) heating at least the binding agent in order to at least partly fluidise it,
   c) cooling the mixture so as to substantially solidify the binding agent and whereby at least a part of the base material becomes bonded by means of the binding agent.

By such a method a culture medium is obtained having a consistency that is substantially the same as the consistency of the original base material. Also, the structure of the culture medium is substantially the same as the structure of the original base material.

These properties of the culture medium obtained by the method according to the invention make the culture medium very suitable for root growth. The culture medium obtained by the method according to the invention is also very suitable to be used for germinating the seeds and cultivating the plants.

Further preferred embodiments of the method according to the invention are described in the dependent claims.

Particular preference is accorded to a method wherein the amount of binding agent is maximally 25% by weight, preferably maximally 15% by weight, more preferably maximally 10% by weight, still more preferably maximally 7% by weight, even more preferably still maximally 5% by weight, and most preferably maximally 4% by weight, related to the weight of the base material. In this way good bonding of the base material is obtained, so that it does not disintegrate, whereas the structure of the culture medium is open such as not to impede root growth.

A further preference is obtained when the particulate base material has a maximum size of 10 mm, preferably a maximum of 5 mm, more preferably a maximum of 2 mm, and still more preferably a maximum of 1 mm. This contributes to the culture medium having a suitable structure for root growth.

In order to allow the culture medium to be used immediately after its manufacture, it is preferred that after mixing the starting materials in step a), a shaping treatment is carried out. Such a shaping treatment may consist, for example, of forming the material into a cylindrical rod. Dividing these into suitable lengths, provides tub shaped culture mediuma for convenient use in market gardening. They are known as "culture plugs". Other shapes are also possible, such as culture mats and culture blocks. Such shapes are generally known in practice, for example, in greenhouse cultivation.

A further preferred embodiment of the method according to the invention is characterised, in that the organic base material is chosen from the group consisting of peat, compost, coconut fibres, coconut granulate, hemp fibres, straw, grass, sawdust, coffee grounds, organic waste, residue from the animal feed industry and residue from the paper industry. Such organic starting materials are generally available and do generally not undergo further processing. The present invention therefore contributes to the recycling of organic waste.

The invention is further preferably characterised, in that the inorganic base material is chosen from the group consisting of clay, soil, perlite, rock wool and other inert inorganic materials. This insures that inorganic materials are recycled.

According to a further embodiment of the invention a preferably biologically degradable elastomer is added during step a). In that case it is possible to reduce the amount of preferably biologically degradable binding agent. The amount of elastomer added and the reduced amount of binding agent may then be geared to one another so as to produce a culture medium with the desired properties. It is a particular advantage that by means of such an embodiment wherein an elastomer is added, a material is endowed with permanent elastic properties. Depending on the glass temperature of the elastomer, elastic properties will be retained even at lower temperatures.

Heating of the binding agent in accordance with step b) of the method according to the invention occurs preferably by means of steam. If steam, preferably dry steam, is added to the mixture from step a) a rapid heating of the mixture can be achieved. Especially if so-called dry steam (that is to say steam containing only water in the gas phase and not condensed water) is added, an effective heating of the mixture will be ensured. It avoids an excessive addition of water. It suffices to supply low pressure steam (for example 0.5 bars overpressure, temperature 112° C.). Such a supply of steam will bring the mixture within a few seconds to a temperature of 100° C. Of course, the heating time depends on the amount of steam and the amount of mixture.

As heating can occur quickly, only a limited amount of water will be fed to the mixture. Steam can simply be introduced into the mixture by means of injection lances, thereby easily ensuring an even distribution of the steam supply and thus an even heating of the entire mixture. A person skilled in the art will be quite capable of optimising the number of injection points and the amount of steam.

Another possibility of heating the mixture obtained in step a) is the use of magnetron radiation. Magnetron radiation has the advantage that the mixture can heat up without physical contact. However, satisfactory measures have to be taken in order to avoid the leakage of magnetron radiation from the heating installation to the environment.

Still another possibility is the use of infrared radiation. The disadvantage here is that, without further measures, the outer layer of the material from step a) is heated quickly, but the bulk of the mixture is heated less quickly. The heat conduction to the bulk is only slow. This is accompanied by the drawback that the outer layer of the mixture, which heats up quickly, can dry out. Heating by means of magnetron radiation will only cause a slight degree of drying out. Heating by means of steam will cause no drying out at all.

The culture medium manufactured in accordance with the method of the invention can be cooled during step c), by means of a forced supply of, for example, a gas or a liquid. However, it is also possible to produce the transition to the solid form according to step c), by means of unforced natural cooling. Depending on the ambient temperature, cooling in this manner may occur within several minutes to several hours.

If forced cooling is not desirable, it is possible to provide the culture medium with a covering. Such a covering may consist of, for example, thin paper or another similar, biologically degradable material. This covering must be strong enough to last during the period of cooling, until the thermoplastic, biologically degradable polymer has solidified sufficiently. Such a covering may, for example, degrade biologically or otherwise. The material only needs to have a consistency such that it does not simply fail during the period in which the culture medium has not yet developed its own firmness.

It is of course preferred that the binding agent is substantially solid when the culture medium has an ambient temperature or work temperature.

The melting range of the thermoplastic, biologically degradable polymer is preferably at temperatures ranging from 20 to 130° C., preferably from 40 to 120° C., and more preferably from 60 to 100° C. The manufactured culture medium obtained by the method of the invention will then have a good form retention at room temperature (approximately 18° C.). At work temperatures above 20° C. it is preferred for the melting range of the polymer to begin at a higher temperature than the work temperature so as to provide the culture medium with a desired form stability during use.

The biologically degradable polymer may be any polymer that does not form any harmful substances during its degradation. A choice may be made from, for example, the following groups:

1) biologically degradable polyesters such as statistic, aliphatic aromatic copolyesters based on the various monomers of butane diol, adipic acid and terephthalic acid;
2) polylactic compounds, including the A and the D variant;
3) polyhydroxybutyrate (PHB) compounds and polyhydroxyalkanoate (PHA) compounds; and
4) starchy compounds.

Examples of suitable representatives from the groups mentioned are the following: polylactic acid, starch, polyesteramide (BAC), poly-$\epsilon$-caprolactone, (for example, the product Mater BI from Novamont SpA in Italy).

Finally, reference is made to a preferred embodiment of the shaping step, wherein during shaping a partial compression of the mixture is obtained. This compression occurs preferably up to 99%, preferably up to 95%, more preferably up to 90%, and still more preferably up to 80% of the original volume of the mixture. In this way the binding agent and base material are slightly better mixed, allowing the binding agent to flow more effectively around the base material than would be the case without such compression. This improves the bonding of the particles of the base material. The same amounts of binding agent will produce a better bonding between the particles of the base material or, in order to obtain a similar bonding, the amount of binding agent may be reduced with such compression.

The invention will now be elucidated with reference to a preferred embodiment.

The figures show a schematic representation of preferred embodiments for carrying out the method.

FIG. 1 shows a first embodiment of the method according to the invention.

FIG. 2 shows a second embodiment of the method according to the invention.

FIG. 3 shows a third embodiment of the method according to the invention.

FIGS. 4, 5 and 6 show a variation of a method according to the invention.

Identical reference numbers in the various figures have the same meaning.

FIG. 1 shows how a bottom layer 1 comprises a second layer 2 placed thereon. The first layer 1 consists of a mixture of base material and binding agent. The base material is chosen from at least one of an organic and inorganic material. Examples of organic materials are peat, compost, coconut fibres, coconut granulate, hemp fibres, straw, grass, sawdust, coffee grounds, organic waste, residue from the animal feed industry and residue from the paper industry. Examples of inorganic base materials are clay, soil, perlite, rock wool and other inert inorganic materials. The term inert inorganic materials refers to the respective material exhibiting no reactivity in the intended application and having no harmful effect on the germination of seeds or on plants growing therein.

The binding agent is a thermoplastic biologically degradable binding agent. A very suitable example of a binding agent is an $\epsilon$-polycaprolactone. Such a material can be obtained from Dow Chemical, and is brought on the market under the trade name Tone Polymers. Such an $\alpha$-caprolactone is biologically degradable and will melt slightly at temperatures above approximately 60° C.

The layer 2 consists of base material. To this no binding agent has been added in the example shown.

The bottom layer 1 has two sides 3, 4. In a shaping operation the bottom layer 1 is folded such that the sides 3, 4 are placed to abut and such that the second layer 2 is surrounded by the first layer 1. This is illustrated in the right-hand half of FIG. 1.

Although in FIG. 1 the bottom layer 1 is shown as a coherent layer, it will be clear that this bottom layer 1 for a large part also consists of base material. Therefore in practice, the difference between the bottom layer 1 and the top layer 2 will be a less obvious, or not visible at all.

Although the thickness in the bottom layer 1 in FIG. 1 is relatively insignificant, this may in practice be considerably thicker. The properties of the shaped product, indicated with the letter A in FIG. 1, will depend on the thickness of the layer 1. The properties of the shaped product A will of course also depend on the amount of binding agent used.

FIG. 2 shows a variation of the embodiment illustrated in FIG. 1. In the embodiment according to FIG. 2, a bottom layer 1 consisting of base material and binding agent is partially covered by a second layer 2. On the second layer 2 a third layer 5 is provided, consisting of a base material and binding agent. The second layer 2 is identical to the layer 2 as shown in FIG. 1.

The top layer 5 in FIG. 2 has two sides 6, 7. A shaping treatment of the construction as shown in FIG. 2, results in a product B. Here the sides 3, 4 of the bottom layer 1 are abutted against the sides 6 and 7, respectively, of the top layer 5. When subjecting this shaped product to a treatment in which the binding agent 6 is made fluid, adhering to and surrounding the particles of the base material, the respective sides 3, 6 or 4, 7, respectively, will also adhere to each other. According to the method of the invention therefore, a culture medium is obtained having a coherent outer layer which consists of base material and binding agent and a coherent inner layer consisting of base material only.

FIG. 3 finally shows a layer 1 consisting of base material and binding agent. This base layer 1 is subjected to a shaping treatment, after which a culture medium C is obtained, consisting entirely of base material and binding agent. The amount of binding agent is preferably, for example, maximally 25% by weight, preferably maximally 15% by weight, more preferably maximally 10% by weight, related to the amount of base material, such that a culture medium is obtained whose consistency is substantially the same as the consistency of just the base material. According to a further preference, the amount of binding agent is maximally 7% by weight, more preferably maximally 5% by weight, and still more preferably maximally 4% by weight, in relation to the amount of base material.

It will be obvious, that the invention is not limited to the embodiment according to a preference of the invention as shown in the figures and described heretofore. Although the figures show only a shaping into a strand, it is also possible to manufacture the material according to the invention in a mould, for example, in the form of a cube of, for example, 10×10×10 cm, or in bar shaped moulds of, for example, 100×20×10 cm, etc., manufacturing such culture media in larger shapes. These may conveniently be used as culture mats of culture blocks, etc., in the so-called substrate cultivation. Substrate cultivation is generally employed in market gardening, for example, in the cultivation of greenhouse vegetables such as tomatoes, peppers, and the like.

A variation for the manufacture of, for example, culture plugs or other formed objects made by means of a method according to the invention, is shown in the FIGS. 4 to 6. FIG. 4 shows a mould 8 having a top side 9 and a bottom side 10. In the mould 8 holes are made all the way through so as to form an opening 11 at the topside 9 and an opening 12 at the bottom side 10. The opening 11 at the top side is slightly larger than the opening 12 at the bottom side 10. The holes are filled from the top side with the mixture of particulate base material and thermoplastic, biologically degradable binding agent. This may be done by applying the mixture using, for example, a scraping knife at the top side 9 of the mould 8, thus filling the holes. The mould may optionally be maintained at a constant elevated temperature, being such that the thermoplastic polymer will at least partly fluidise. This will cause the polymer and base material to bond in the mould. In order to be able to fill the holes in the mould 8 properly, it is preferred for the mould 8 to be placed upon a base, so that the openings 12 at the bottom side 10 are closed off.

In a subsequent step the mould 8 is inverted, whereby the top side 9 is at the bottom and the bottom side 10 is at the top. This is illustrated in FIG. 5. There are only two holes shown in the mould 8; it will however be obvious that in practice a plurality of holes may be provided in the mould 8. Under the mould 8 there is a tray 13, such that the holes in the mould 8 are aligned with recesses in the tray 13. Culture media in the holes in the mould 8 may subsequently be pushed downward from the side 10 of the mould 8, thereby placing the culture media in the recesses in the tray 13.

Pressing out the shaped culture media from the mould 8 may be facilitated if the holes have a slightly conical shape. It is preferred for the opening in the bottom side 10 to be slightly smaller than the opening in the top side 9. In this way the hole passing through the mould 8 receives a conical shape. When the mould 8 is inverted (as shown in FIG. 5), the shaped culture medium can easily be pressed out of the mould 8.

FIG. 6 shows a further elucidation of the step for pushing the shaped culture medium out of the hole in the mould 8. For this purpose a push-out member 14 is placed above the hole 12. This push-out member 14 can be pushed downward in the direction of the opening 11, that is to say through the hole in the mould 8, thereby pushing the shaped culture medium out of the hole in the mould 8. When the mould 8 is placed upon the tray 13 so as to be in contact therewith, it suffices that the push-out member 14 can be moved to the opening 11. When the culture medium is introduced into the recesses in the tray 13, the end of the push-out member 14 may still be in contact with the topside of the shaped culture medium. As also shown in FIG. 6, the push-out member 14 is provided with a spindle 15, which can be moved downward from the end of the push-out member 14. In an execution situation, the spindle 15 is positioned as shown by the dotted lines with reference number 16. When the end of the push-out member is situated just above the surface of the culture medium and the spindle 15 is employed, an opening will be formed in the culture medium (not shown). This greatly facilitates the placing of, for example, young plants, cuttings or seeds and the like in the culture medium. If this step for the formation of an opening in the culture medium is carried out while the temperature is still in the melting region of the polymer or above, the opening will on cooling stay intact.

In the Figures the tapering of the holes in the mould 8 is exaggerated. In practice the difference between the sizes of the openings 11 and 12 may be much smaller, so that the ease of pushing-out the culture medium from the mould 8 is maintained.

Heating the binding agent in order to fluidise it, may take place in various ways. As already mentioned above, it is preferred to heat with the aid of steam. For this purpose steam may be injected into the mixture by means of injection lances, so that, depending on the number of injection points, an even heating of the mixture is obtained. A person skilled in the art is capable of determining the number of injection points as well as the amount of steam to be injected so as to ensure a suitable heating of the mixture. It is preferred to use dry steam, that is to say steam from which condensed water has been removed. In a suitable embodiment it is easily possible to within a few seconds reach a temperature of the mixture of approximately 100° C. This is possible even if the mixture has layer thicknesses of up to 10 cm or more. To this end, for example, steam at a pressure of 0.5 bars overpressure and a temperature of 112° C. may be used. Due to the great heat capacity of the steam only a very small amount is necessary for heating the mixture.

Another possibility is the use of infrared radiation. Another possibility still is the use of magnetron radiation. The consistency of the binding agent then needs to be such as to enable it to be heated by means of magnetron radiation. The binding agent may also be heated indirectly by heat transfer via water contained in the mixture and heated by magnetron radiation.

If the outer rim of the culture plug, as shown in the FIGS. 1 and 2, is provided with binding agent but the core consists only of base material, it is quite easy to insert plants into the loose interior of the plug without the plug disintegrating.

As biologically degradable polymers all polymers that produce no harmful substances during degradation may be used. This means that the degradation products must not contain any components that are harmful for plants and animals. It is possible to use biologically degradable synthetic polymers or biologically degradable biopolymers. Combinations thereof are also possible. In general the polymers may be chosen from:
1) biologically degradable polyesters such as statistical, aliphatic aromatic copolyesters that are based on the different monomers of butane diol, adipic acid and terephthalic acid;
2) polylactic acid compounds, including the A and D variant;
3) polyhydroxybutyrate (PHB) compounds and polyhydroxyalkanoate (PHA) compounds; and
4) starchy compounds.

Such polymers may be chosen, for example, from polylactic acid, starch, polyester amide or polycaprolactone.

The dimensions of the culture media may be varied extensively. For example, the medium may have a shape and size that always exactly fits into a recess in a culture block. Suitable dimensions are plugs having a diameter of 13 mm, 20 mm and 28 mm. These are generally used in practice.

Some of the polymers have a hydrophobic effect. However, as the culture medium manufactured in accordance with the method only comprises base material and binding agent, such a hydrophobic property of the binding agent is in practice without effect on the water absorbent capacity of the base material. It is however preferred that the amount of binding agent does not exceed a maximum of 25% by weight.

In order to greatly improve the wettability of the base material, a surface tension reducing agent may be added, for example, WMC. This increases the water absorption of the culture medium to be obtained.

The invention claimed is:

1. A method of manufacturing a culture medium on which plants can be grown, the method comprising the steps of:
   a) mixing
      I: a particulate base material, chosen from at least one of organic and inorganic materials, with
      II: a thermoplastic biologically degradable binding agent;
   b) positioning a first layer comprising a mixture of said base material and said binding agent, upon which a second layer of base material that is substantially free of binding agent is positioned, and optionally a third layer comprising a mixture of said base material and said binding agent;
   c) carrying out a shaping treatment to fold the first layer over the second layer or to move the first and third layer at both sides of the second layer toward each other, such that the second layer containing only base material is completely surrounded by either the folded first layer or the first and third layers, the surrounding layer containing said mixture of base material and binding agent;
   d) heating at least the binding agent in said surrounding layer using a heating agent selected from the group consisting of steam, infrared radiation, and magnetron radiation in order to at least partly fluidise the binding agent with the base material;
   e) cooling the mixture so as to substantially solidify the binding agent in said surrounding layer to bond together the base material in said surrounding layer.

2. A method according to claim 1, wherein the amount of binding agent is maximally 25% by weight of the base material.

3. A method according to claim 2, wherein the amount of binding agent is maximally 15% by weight of the base material.

4. A method according to claim 3, wherein the amount of binding agent is maximally 10% by weight of the base material.

5. A method according to claim 4, wherein the amount of binding agent is maximally 4% by weight of the base material.

6. A method according to claim 1, wherein the organic base material is chosen from the group consisting of peat, compost, coconut fibres, coconut granulate, hemp fibres, straw, grass, sawdust, coffee grounds, organic waste, residue from the animal feed industry and residue from the paper industry.

7. A method according to claim 1, wherein the inorganic base material is chosen from the group consisting of clay, soil, perlite, rock wool and other inert inorganic materials.

8. A method according to claim 1, wherein the particulate base material has a maximum size of 10 mm.

9. A method according to claim 8, wherein the particulate base material has a maximum size of 5 mm.

10. A method according to claim 9, wherein the particulate base material has a maximum size of 1 mm.

11. A method according to claim 1, wherein a biologically degradable elastomer is added during step a).

12. A method according to claim 1, wherein step e) is performed by means of a forced supply of, for example, a gas or a liquid, or by means of unforced natural cooling.

13. A method according to claim 1, wherein a culture medium is shaped in the form of a culture plug, a culture mat, a culture block, or the like.

14. A method according to claim 1, wherein during the shaping treatment a compression is performed such that the shaped culture medium has up to 99% of the original volume of the mixture.

15. A method according to claim 14, wherein during the shaping treatment a compression is performed such that the shaped culture medium has up to 80% of the original volume of the mixture.

16. A method according to claim 1, characterised in that the melting range of the thermoplastic, biologically degradable polymer is at temperatures ranging from 20 to 130° C.

17. A method according to claim 16, characterised in that the inciting range of the thermoplastic, biologically degradable polymer is at temperatures ranging from 40 to 120° C.

18. A method according to claim 17, characterised in that the melting range of the thermoplastic, biologically degradable polymer is at temperatures ranging from 60 to 100° C.

* * * * *